United States Patent [19]
Salazar et al.

[11] Patent Number: 5,645,665
[45] Date of Patent: Jul. 8, 1997

[54] INTRAOCULAR LENS FABRICATION

[75] Inventors: Mike A. Salazar, Albuquerque; Larry R. Foreman, Los Alamos, both of N.M.

[73] Assignee: The Regents of the University of California Office of Technology Transfer, Alameda, Calif.

[21] Appl. No.: 451,707

[22] Filed: May 26, 1995

[51] Int. Cl.$^6$ ............................................. B29D 11/00
[52] U.S. Cl. ........................ 156/73.1; 156/242; 156/292; 264/1.1; 264/2.7
[58] Field of Search .................... 156/73.1, 145, 156/196, 242, 245, 267, 285, 292, 308.4; 264/1.1, 1.32, 1.7, 2.7, 322, 292, 554; 623/6

[56] References Cited

U.S. PATENT DOCUMENTS

| | | | |
|---|---|---|---|
| 2,644,985 | 7/1953 | Crandon | 264/2.7 |
| 3,475,521 | 10/1969 | Stroop | 264/1.7 |
| 4,253,199 | 3/1981 | Banko | 623/6 |
| 4,466,705 | 8/1984 | Michelson | 350/418 |
| 4,478,596 | 10/1984 | Michelson | 604/890 |
| 4,685,921 | 8/1987 | Peyman | 623/6 |
| 4,693,717 | 9/1987 | Michelson | 623/6 |
| 4,709,996 | 12/1987 | Michelson | 623/6 |
| 4,883,485 | 11/1989 | Patel | 623/6 |
| 4,950,289 | 8/1990 | Krasner | 623/6 |
| 4,976,896 | 12/1990 | Short et al. | 264/2.7 |
| 4,995,880 | 2/1991 | Galib | 623/6 |
| 5,091,121 | 2/1992 | Nakada et al. | 264/1.7 |
| 5,213,579 | 5/1993 | Yamada et al. | 623/6 |

*Primary Examiner*—Michael W. Ball
*Assistant Examiner*—Richard Crispino
*Attorney, Agent, or Firm*—Gemma Morrison Bennett

[57] ABSTRACT

This invention describes a method for fabricating an intraocular lens made from clear Teflon™, Mylar™, or other thermoplastic material having a thickness of about 0.025 millimeters. These plastic materials are thermoformable and biocompatable with the human eye. The two shaped lenses are bonded together with a variety of procedures which may include thermosetting and solvent based adhesives, laser and impulse welding, and ultrasonic bonding. The fill tube, which is used to inject a refractive filling material is formed with the lens so as not to damage the lens shape. A hypodermic tube may be included inside the fill tube.

7 Claims, 13 Drawing Sheets

Fig.13 ern
INTRAOCULAR LENS FABRICATION

This invention was made with government support under Contract No. W-7405-ENG-36 awarded by the U.S. Department of Energy. The government has certain rights in the invention.

FIELD OF THE INVENTION

The present invention relates to surgically inserted intraocular lenses, and more particularly to the method of fabricating these lenses which are filled with an appropriate index of refraction fluid subsequent to their implantation.

BACKGROUND OF THE INVENTION

Many thermoformable plastic materials lend themselves to use as lens replacements as long as the biocompatable aspects have been met. U.S. Pat. No. 4,693,717 to Michelson describes a method of implanting an artificial lens within an eye. The method includes providing a collapsible lens mold comprised of a transparent, flexible sheath which defines a cavity bounded by opposite anterior and posterior portions of the sheath. The sheath portions are each preformed so that the cavity has a predetermined lenticular shape when the cavity is filled with a flowable material. The mold further includes a tube connected to the sheath and communicating with the cavity for providing a conduit for a flowable material to be injected into the cavity. The mold is inserted in a collapsed condition into an eye so that the tube is accessible to a tool for injecting a flowable material into the cavity. Michelson, however, does not describe a method to form such a lens, or to incorporate a fill tube, which is the subject of the present invention.

It is, therefore, an object of the present invention to provide a method of fabricating intraocular lens along with a tube to inject a filling material.

Additional objects, advantages, and novel features of the invention will be set forth in the description which follows, and in part will become apparent to those skilled in the art upon examination of the following or may be learned by practice of the invention. The objects and advantages may be realized by the methods described herein and particularly pointed out in the appended claims.

SUMMARY OF THE INVENTION

To achieve the foregoing and other objects, and in accordance with the purposes of the present invention, as embodied and broadly described herein, the invention comprises a method for fabricating an intraocular lens made from clear Teflon™ (polytetrafluoroethylene), Mylar™ (polyalkylene terephthalate), or other clear plastic films with a thickness of about 0.025 millimeters(mm). These plastic materials are thermoformable and biocompatable with the human eye. Two lenticular shaped films are bonded together with a variety of procedures which may include thermosetting and solvent-based adhesives, laser and impulse welding, and ultrasonic bonding. A tube, which is used to inject a refractive filling material, is included with each of the lens halves and does not affect the shape of the lens.

BRIEF DESCRIPTION OF THE DRAWINGS

The accompanying drawings which are incorporated in and form a part of the specification, illustrate the embodiment of the present invention and, together with the description, serve to explain the principles of the invention. In the drawings.

DETAILED DESCRIPTION

The following is a description of the procedures used in the thermoforming and bonding of plastic lens inserts for use as lens replacements for the eye.

In the preferred embodiment of this invention, a thermoforming process shapes the clear plastic membranes into lenticular shape. Many clear plastic materials can be formed into lens shapes and bonded together with a variety of procedures. These include thermosetting adhesives, thermoplastic adhesives, solvent based adhesives, ultrasonic bonding, laser welding, impulse welding, etc. The tube used to inject the filling material is formed with the lens during the thermoforming operation.

Figure 1:
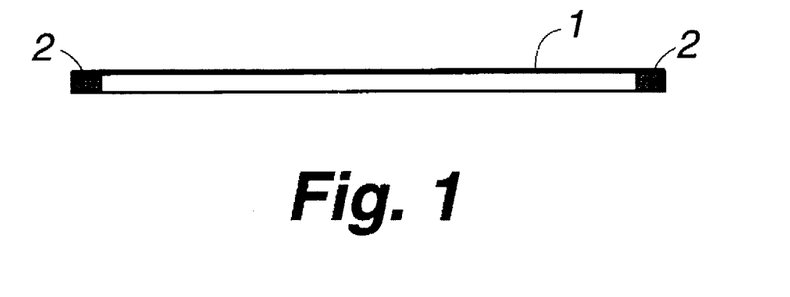
FIG. 1 is a sectional view of a stretched film of plastic material which is attached to a support ring.

In particular, FIG. 1 depicts the stretched film 1 of plastic material bonded to a ring 2. The purpose of this step is to ensure a wrinkle free film. The film is cut and laid out on a smooth steel plate. The film is stretched out and its edges are taped down to ensure a tight film. Adhesive is applied to the ring, the ring is placed onto the film and the unit is placed onto a hydraulic press to bond the film. Commercial epoxy, or urethane is used for this application. Any adhesive that will hold the film at forming temperatures will work. If the film is difficult to bond, then the film can be stretched between two rings and the rings bolted through to hold the film tight for subsequent operations or an adhesive tape is used to hold the film to the larger fixture ring.

Figure 2:
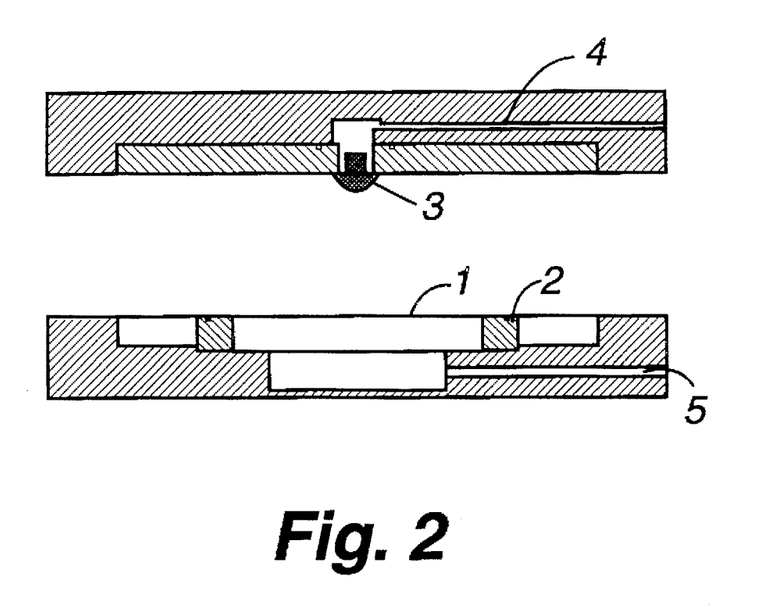
FIG. 2 is a sectional view of the forming fixture before closure.

FIG. 2 depicts the film 1 mounted onto the forming fixture before closure. The lens mandrel 3 is cut to provide the proper optical power for the lens. It is made on an air-bearing computer-controlled, diamond turning machine to give the lens mandrel the smooth finish required of optical elements; the finish on the mandrel is transferred to the film to give the intraocular lens the proper optical finish. The press fixture is preheated to the softening temperature of the selected film. The mounted film is placed onto the preheated press fixture [190° C. for Mylar™ or 150° C. for Teflon™]. Port 4 is a vacuum port; port 5 is a port for applying pressure.

Figure 3:
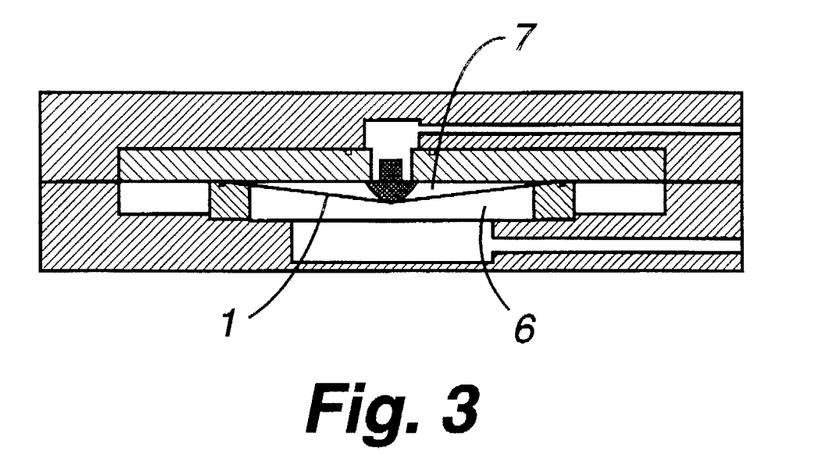
FIG. 3 is a sectional view of the forming fixture at closure.

FIG. 3 shows the film 1 being stretched at press closure. The press load must be sufficient to prevent premature opening of the fixture when it is pressurized, typically 10 tons total load. At this step the press is fully closed and the film 1 is rapidly heated to the forming temperature by the preheated press fixtures. Pressure will be applied to space 6 and vacuum will be applied to space 7 in the forming operation.

Figure 4:
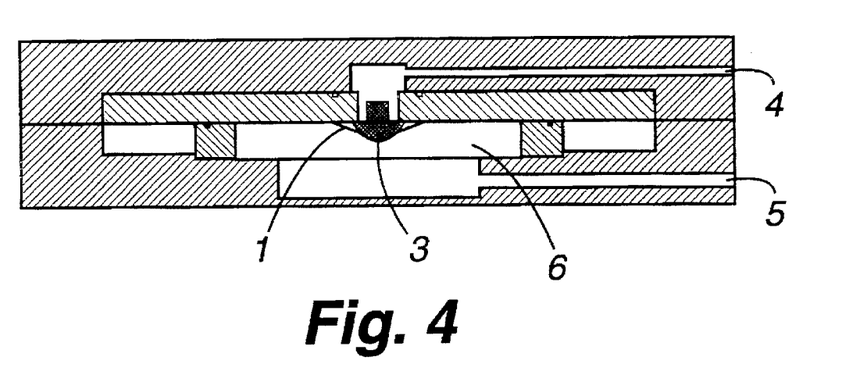
FIG. 4 is a sectional view of the forming fixture with a partially formed one-half lens.

FIG. 4 depicts the shaping of the film 1 as it conforms to the lens mandrel 3 under the influence of heat, vacuum, and pressure. The hot film 1 has the air between the film 1 and the male mandrel 3 removed by vacuum at 20 inches of mercury through the port 4 on the lens mandrel side of the fixture. Sufficient air pressure at 20 psig is applied through port 5 on the other side of the film 1 to force the film 1 to conform to the lens shaped mandrel 3.

Figure 5:
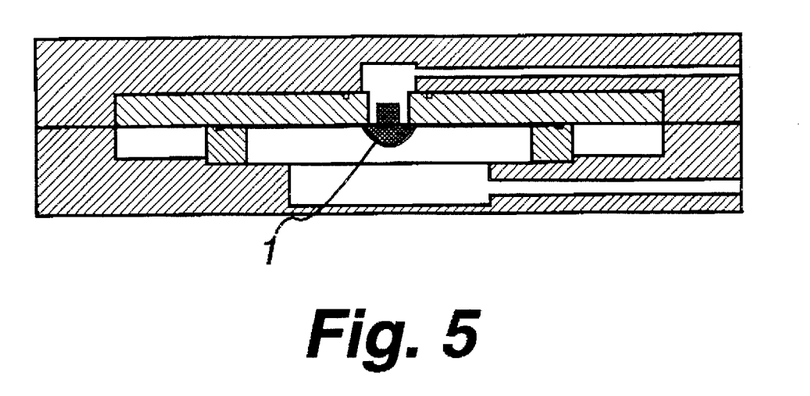
FIG. 5 is a sectional view of the forming fixture with a shaped lens half.

FIG. 5 shows a shaped lens in the forming fixture. At this step, the film 1 has fully formed to the lens shape. Immediate cooling with no hold time is possible. The press fixture is cooled while vacuum and air pressure are maintained. The fixture and formed lens are cooled to room temperature. This cool down insures accuracy of the final shape.

Figure 6:
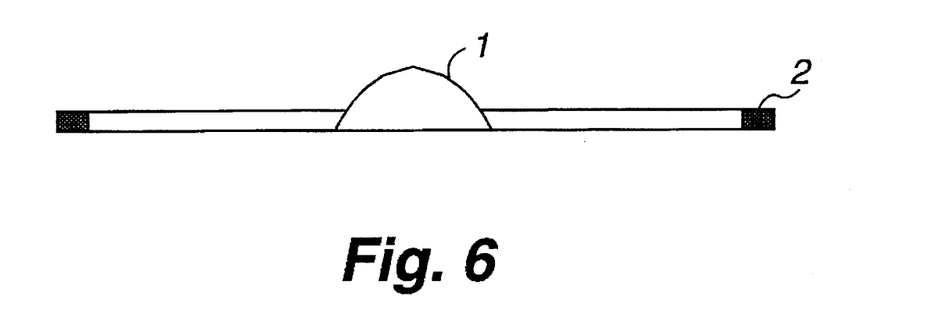
FIG. 6 is a sectional view of one-half formed section of lens still mounted on a support ring.

FIG. 6 shows the final lens shape still mounted on the ring 2. The support ring with the attached formed half lens 1 has been removed from the cooled forming fixture.

Figure 7:
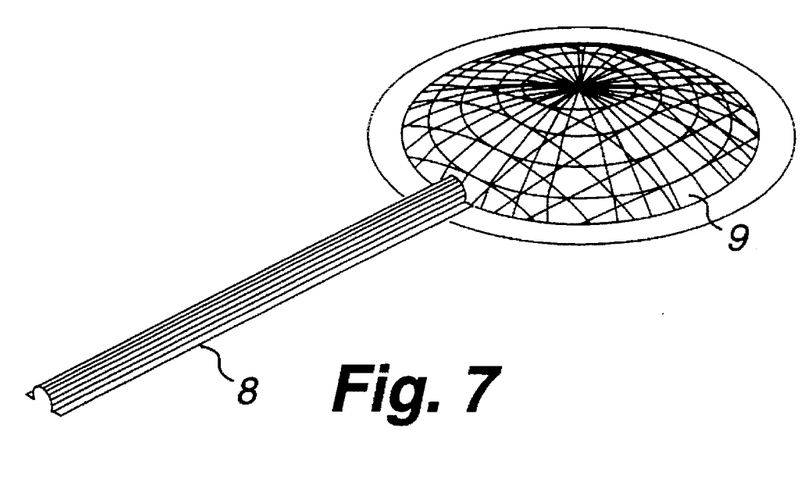
FIG. 7 is a perspective view of a formed half lens with the integral fill tube.

FIG. 7 depicts a formed half lens 9. This view includes the formed section for the fill tube 8. The fill tube 8 is formed with the lens 9 to allow filling without damaging or altering the lens shape.

Figure 8:
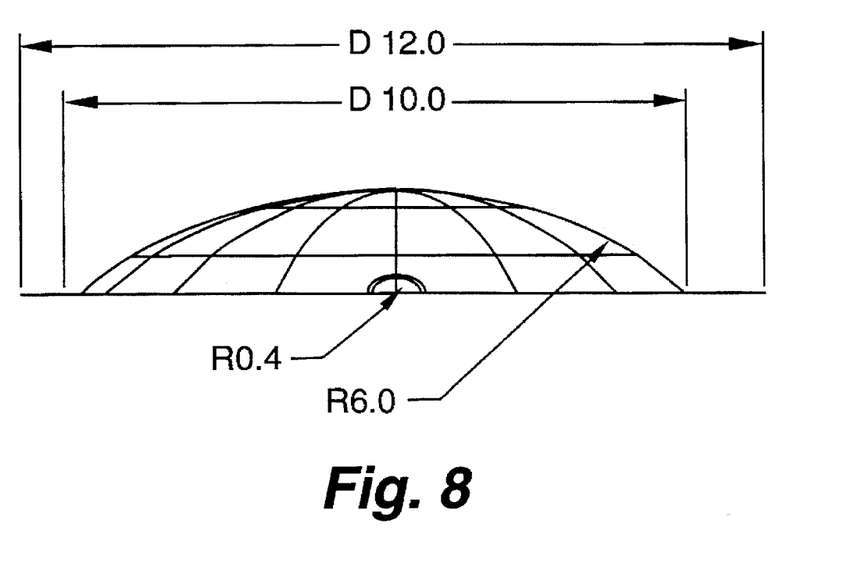
FIG. 8 is a side view of a formed half lens with fill tube and stating typical dimensions in millimeters.

FIG. 8 states and shows the typical dimensions of the formed lens half in millimeters. Two halves joined together make a lens.

Figure 9:
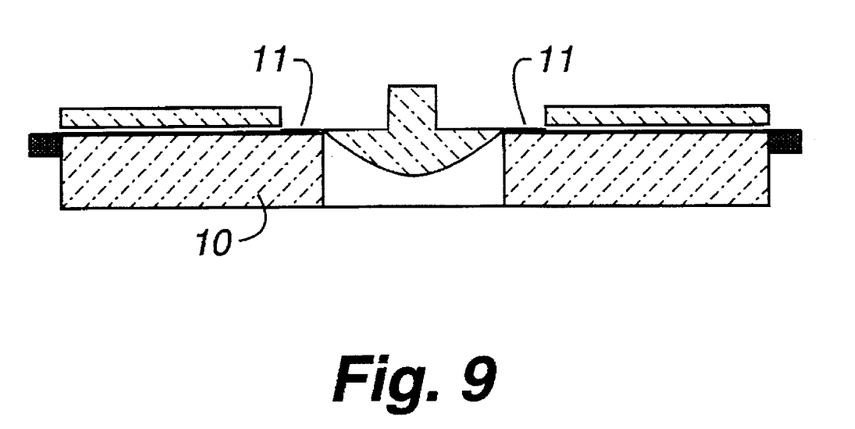
FIG. 9 is a sectional view of a masking fixture used to apply adhesive prior to bonding the two lens halves together.

FIG. 9 depicts a fixture 10 used to mask the lens for application of an adhesive 11 prior to bonding two lens halves together. Adhesives 11 for bonding Mylar™ include epoxy and urethane thermosets. Fluorinated solvents serve as adhesives for Teflon™. The adhesive is usually applied by hand with an applicator, but it could also be applied by a variety of methods such as spray and silk screen.

Figure 10:
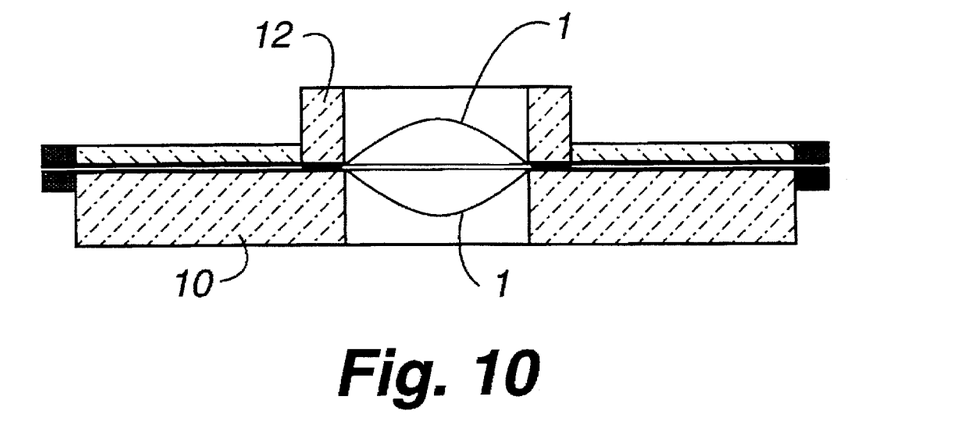
FIG. 10 is a sectional view of a bonding fixture showing the two halves of the lenses being bonded together.

FIG. 10 shows the two halves of the lens 1 being bonded together. Nothing prevents one from joining two lens halves that have been formed by different lens mandrels. The lens so formed would be asymmetrical, and there may be opthalmic reasons for such a lens. The bonding fixtures 10, 12 apply pressure and heat across the bond area. In addition to adhesives, a large variety of techniques are available for the bonding of the lens halves into complete lens assembly. The method of bonding must be appropriate for the material type being used. Using a fixture 10, 12 as suggested allows bonding by application of heat and pressure using ultrasonic or impulse welding. Impulse welding of Teflon™ is accomplished at a temperature of 162° C. for five seconds. Teflon is adhesively bonded in a fixture 10, 12 as described above at 50° C. for three hours at a pressure of 2000 psi.

Figure 11:
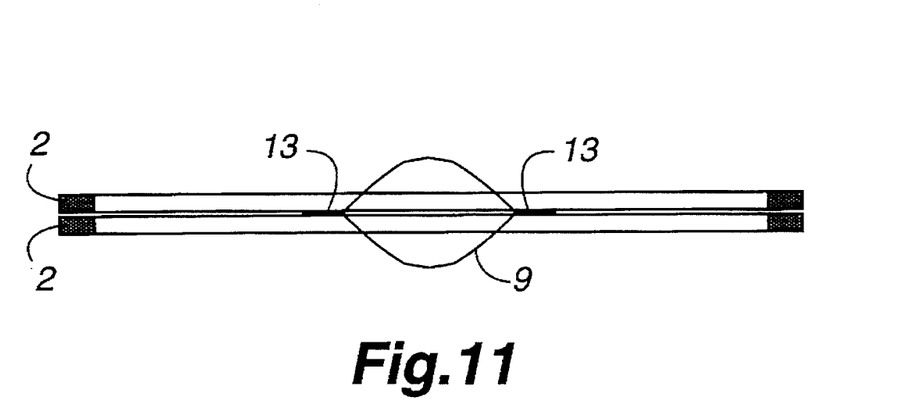
FIG. 11 is a sectional view of the fully formed and assembled lens.

FIG. 11 shows the fully formed and assembled lens 9. The two halves are now joined at the desired locations 13.

Figure 12:
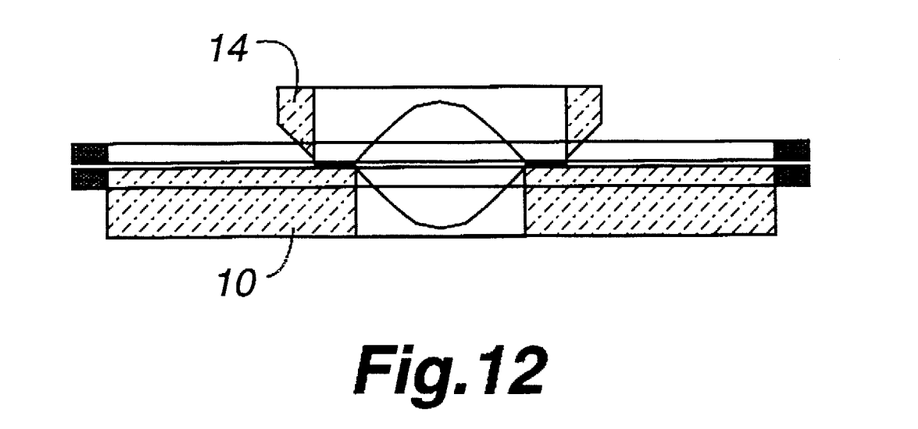
FIG. 12 is a sectional view of a punch trimmer to remove excess material from the periphery of the lens.

FIG. 12 depicts punch type trimming operation 14 to remove excess material from the periphery of the lens. The trimming operation is done with a sharp edge heated by ultra-sonic or impulse means. It can also be trimmed at room temperature.

Figure 13:
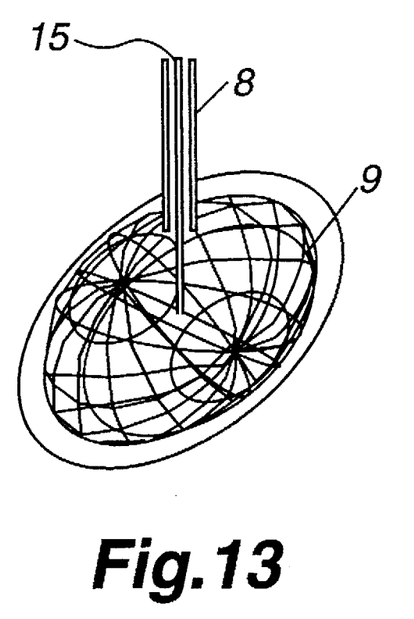
FIG. 13 is a perspective view of a finished lens assembly having a hypodermic tube inside the fill tube.

FIG. 13 is the finished lens assembly. This figure shows a finished lens 9 including a fill tube 8. A hypodermic tube 15 can be included in the assembly at time of joining the two halves. Typically the hypodermic tube 15 is 0.7 mm outside diameter with an inside diameter of 0.5 mm.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A method of fabricating an intraocular lens, comprising the following steps: fastening a thin clear plastic film to a ring, placing said ring in a forming fixture that is capable of heating, forming the film into a lenticular shape with a longitudinal half section of a fill tube projecting therefrom, said forming fixture providing the proper optical finish for an intraocular lens, repeating the process to obtain a second lenticular shaped film with a longitudinal half section of a fill tube projecting therefrom, and bonding together the two shaped films to form a lens including a fill tube.

2. The method of claim 1 in which the clear plastic film is selected from the group consisting of polytetrafluoroethylene and polyalkylene terephthalate.

3. The method of claim 2 in which the said clear plastic film has a thickness of about 0.025 millimeters.

4. The method of claim 1 in which the clear plastic film is heated to above and about 150° C. so as to form a lenticular shape.

5. The method of claim 1 in which the fill tube has a diameter of about 0.8 mm.

6. The method of claim 1 in which the bonding is accomplished by a heat and pressure process selected from the group consisting of ultrasonic, impulse welding, and adhesive bonding.

7. The method of claim 1 in which a hypodermic tube is included inside the said fill tube.

* * * * *